United States Patent Office.

FREDRICK WILLIAM IHNE, OF KANSAS CITY, MISSOURI.

PROCESS OF MAKING CHROME-YELLOW.

SPECIFICATION forming part of Letters Patent No. 457,028, dated August 4, 1891.

Application filed November 4, 1890. Serial No. 370,274. (No specimens.)

*To all whom it may concern:*

Be it known that I, FREDRICK WILLIAM IHNE, of Kansas City, in the county of Jackson and State of Missouri, have invented a new and Improved Process for the Manufacture of Chromate of Lead or Chrome-Yellow, of which the following is a full, clear, and exact description.

The object of the invention is to provide a new and improved process for manufacturing from galena chemically pure chrome-yellow having great covering power.

The process consists of first dissolving pulverized galena with nitric acid to produce liquid nitrate of lead and then precipitating the chromate of lead by subjecting the nitrate of lead to the action of bichromate of potassa, neutral chromate of potassa, or chromate of potassa soda. In carrying this process into effect I proceed as follows: The galena (sulphuret of lead) is first pulverized by suitable means, and in case it contains foreign minerals or other impurities it is washed or otherwise treated in a suitable manner to remove the said minerals or other impurities. The pulverized galena is then placed in vessels of wood or other suitable material, and is therein dissolved by adding nitric acid diluted in water, the entire mass being stirred by suitable means actuated by hand or other motive power. A slow dissolving takes place at the ordinary temperature; but when it is desired to further the dissolving process the mass is heated artificially either by heating the vessel containing the mass or by using hot water added to the nitric acid, or by the use of steam. The product obtained is nitrate of lead in a liquid state. The quantity of nitric acid necessary for dissolving a certain quantity of galena depends on the percentage of lead contained in the ore and to a certain extent on the amount and nature of impurities contained in the galena, and also on the length of time in which the dissolving takes place. In treating one hundred pounds of galena having eighty per cent. of metallic lead about ninety to one hundred pounds of nitric acid of 36° to 38° Baumé are used, and the nitric acid is diluted with one hundred to two hundred pounds of water. This mixture is left for from about twenty-four to thirty-six hours and is stirred up occasionally, as above stated. After the galena is dissolved by the nitric acid and the sulphuret of lead is changed into liquid plumbic nitrate (or nitrate of lead) then the sulphur which floats occasionally on the surface of the solution is removed and the substance which remains undissolved is washed out and is also removed. The liquid nitrate is then passed through filters of suitable material, such as felt, linen, hemp, flannel, &c., or is left standing for from twelve to eighteen hours for settling and clearing.

Now in order to produce the chrome-yellow from this nitrate of lead I dissolve bichromate of potassa in water and pour a sufficient quantity of this solution into the plumbic nitrate solution until all the plumbic nitrate is changed into chromate of lead, called "chrome-yellow." Instead of the bichromate of potassa, neutral chromate or chromate of potassa soda may be used, and for the purpose of obtaining lighter tints I may temper them with sulphuric acid or any other compound of sulphur. The liquid nitrate of lead is placed, preferably, in large open receptacles of wood, clay, earthenware, or other suitable material, and the chromate-of-potassa solution is placed in similar vessels and then placed above the receptacles containing the plumbic nitrate. The chromate of potassa can then easily be run into the lower receptacles containing the liquid nitrate of lead, and this mixture is constantly agitated by suitable means until all the plumbic nitrate is changed into chromate of lead, which is precipitated on the bottom of the larger receptacles. The chemical action which takes place by this changing of nitrate of lead into chromate of lead is that the chromic acid of the potassa assumes the place of the nitric acid, which parts from the lead and assimilates with the potassium, so that the lead as chromate of lead is precipitated on the bottom of the receptacle, while the nitric acid of the plumbic nitrate remains with the potassium, which latter has parted with its chromic acid and a quantity of water as solution above the chromate of lead.

To change the nitrate of lead recovered out of the one hundred pounds of galena above mentioned into chromate of lead about fifty-six pounds of bichromate of potassa are used. This change usually takes place in from about ten to thirty minutes, after which the chrome-yellow (chromate of lead) is left for a few hours to settle, and then the solution standing on top of the chrome-yellow is drawn off by suitable means or run out of the vessel by opening a cock or cocks placed above the level of the chromate of lead. The latter is then washed by adding pure water, which is poured upon the chrome-yellow, and the mixture is stirred up by suitable means, so that all the remaining liquid nitrate of potassa is removed from the chromate of lead. After this is accomplished the mass is left to settle and the water is again drawn off from the chrome-yellow, which then settles on the bottom of the receptacle. This washing is repeated as often as is deemed necessary. The chrome-yellow is then placed in suitable receptacles and dried in the open air or in specially-constructed drying-rooms, after which it is packed in boxes, kegs, &c., and is then ready for use. The liquid nitrate of potassium or saltpeter-lye removed from the receptacles in which the chrome-yellow is precipitated and the first water used for washing the chrome-yellow, as above described, are placed in large open flat receptacles or excavations, so as to be exposed to the action of the air and sun, or the liquids may be operated on by a small graduation work, so that a great portion of water evaporates. The residue is then heated in suitable vessels or troughs by a slow heat until a salt crust is formed, which, when cooled off and left to dry, is nitrate of potassium or saltpeter in a pure state. From one hundred pounds of galena having eighty per cent. metallic lead from twenty-eight to thirty pounds of pure and dry saltpeter are produced by the above-described process. The sulphur produced by the dissolving of the galena by nitric acid is melted in a small stove or furnace in the usual manner and then refined, so as to produce bars of sulphur called "brimstone." About ten pounds of such sulphur are produced from one hundred pounds of such galena treated in the manner described.

The chrome-yellow produced by my process is chemically pure and of great covering power, being equal to the best chrome-yellow in the market.

The process is very simple and the crude lead ore is transformed into chrome-yellow in from three to four days.

Having thus described my invention, what I claim as new, and desire to secure by Letters Patent, is—

1. The herein-described process for the manufacture of chrome-yellow, consisting of first dissolving pulverized galena with nitric acid to produce liquid nitrate of lead, and then precipitating chromate of lead by subjecting the nitrate of lead to the action of the bichromate of potassa, neutral chromate of potassa, or chromate of potassa soda, substantially as shown and described.

2. The herein-described process for the manufacture of chrome-yellow, consisting of first dissolving pulverized galena with diluted nitric acid to produce liquid nitrate of lead, and then adding to the latter a solution of bichromate of potassa or neutral chromate of potassa or chromate of potassa soda dissolved in water, whereby chrome-yellow is precipitated and a saltpeter-lye is formed, which latter is then drawn off and condensed to form nitrate of potassium or saltpeter, substantially as shown and described.

3. The herein-described process for the manufacture of chrome-yellow from galena, consisting of dissolving the pulverized galena with diluted nitric acid to produce nitrate of lead and sulphur, and then heating the latter and refining the latter into bars of sulphur, substantially as shown and described.

FREDRICK WILLIAM IHNE.

Witnesses:
T. C. CURRAN,
JOHN H. WILES.